UNITED STATES PATENT OFFICE 2,650,934

ESTERS OF SILICIC ACIDS AND METHODS OF MAKING THE SAME

John B. Rust, Montclair, and Leonard Spialter, Irvington, N. J., assignors, by direct and mesne assignments, of one-half to Montclair Research Corporation, a corporation of New Jersey, and one-half to Ellis-Foster Company, a corporation of New Jersey No Drawing. Application September 21, 1945, Serial No. 617,920

6 Claims. (Cl. 260—448.8)

This invention relates to the production of halo-esters of orthosilicic acids and orthosilicoformic acid and to processes of making the same, as well as derivatives of such esters.

In the customary preparation of silicon esters, silicon tetrachloride (or other halide), is reacted with an organic hydroxyl containing compound, such as an alcohol, phenol, glycol, etc., with or without a solvent according to the equation

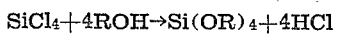

$$SiCl_4 + 4ROH \rightarrow Si(OR)_4 + 4HCl$$

Refluxing, after mixing of the reactants, is usually necessary to drive the reaction to completion. As can be seen from the reaction, a considerable volume of hydrogen chloride is evolved as a by-product and presents a removal and disposal problem. Further, if the hydroxylic compound is not completely anhydrous hydrolysis and condensation of the silicon ester will occur assisted by the refluxing temperature and catalytic action of the hydrochloric acid. The condensed esters appear as resinous side products and reduce the yield of ester. The complete removal of moisture from hydroxylic compounds is very difficult due to their well-known general hygroscopicity and hydrophyllic character. On the other hand, decreasing time or elimination of final reflux results in a mixture of products and intermediates.

If metallic alcoholates, glycolates, phenates, etc., are used to do away with necessity for using specially dried reactants and disposing of the evolved hydrogen halide, there are two other problems. One is the separation of the by-product salt and the other is choice of a suitable solvent for the alcoholate or other metal hydroxylate. The only practical solvent is the hydroxy compound itself, and, when used, it must be anhydrous to prevent base-catalyzed hydrolysis and condensation of the ester.

The method of ester interchange may be used, but this requires a previously prepared ester, increasing cost and complexity of preparation.

It is known that when ethylene oxide or other organic compound containing the epoxy or oxirane configuration is reacted with an organic acyl halide, of the general type RCOCl, beta chloralkyl esters are formed. It is also known that in certain cases when epoxy compounds are brought into contact with inorganic halides, such as aluminum chloride, tin tetrachloride and the like, polymerization of the epoxy compound occurs, often very vigorously, with the formation of tarry or resinous substances. In this latter case, the inorganic halides do not react stoichiometrically with the epoxide to form pure isolateable chemical entities, but act instead as polymerization initiators or catalysts. For example, a trace of tin tetrachloride will polymerize a relatively large amount of ethylene oxide. An exception to this catalytic effect has been noted in the case of arsenic trichloride, wherein trichlorethyl arsenite and certain of its intermediates have been prepared.

Among the objects of the present invention is the production of organic esters of orthosilicic and orthosilicoformic acids by relatively simple and inexpensive means, thus obtaining compounds having a variety of commercial and technical applications.

Further objects include the production of halo esters of silicic acids and of silicoformic acid which are capable of being completely or partially hydrolyzed and condensed to polymeric products suitable for use as film-forming materials, binders, impregnants, protective coatings, and the like.

Further objects include the production of such esters useful in organic synthesis, as, for example in the preparation of pure chlorhydrins, as intermediates in the preparation of organosilicon derivatives, etc.

Still further objects include the synthesis of halo-alkoxy silicon halides.

Still further objects and advantages of the present invention will appear from the more detailed description set forth below, it being understood that this more detailed description is given by way of illustration and explanation only, and not by way of limitation, since various changes therein may be made by those skilled in the art, without departing from the scope and spirit of the present invention.

It has been found that a reaction between epoxy-compounds and silicon halides occurs with the greatest of facility, leading to the progressive formation of halo-alkyl silicon halides and silicates with little or no by-product resin being produced. This reaction is surprising, inasmuch as it is known that silicon tetrachloride displays catalytic and other chemical properties in many cases parallel to and almost as great as those of tin tetrachloride. The derivatives formed in the process of the present invention, however, are easy to prepare in a very short time and are obtained in excellent yield in a high state of purity.

The epoxide derivative employed may be an epihydrin or a substituted epihydrin, including the epihydrins and substituted epihydrins of both the alkylene and olefinyl type, and in the substituted derivatives the substituent groups may be organic including aliphatic, aromatic, and carbocyclic non-aromatic, such as alkyl, alkenyl, olefinyl, alkynyl, alicyclic, aryl, arenyl, arynyl, aralkyl, alkaryl, or may be inorganic including halogen such as chlorine and bromine, hydroxyl, etc. As illustrative of such epihydrins there may be mentioned specifically alkylene oxides such as ethylene oxide, propylene oxide, and the like, as well as epichlorhydrin, butadiene monoxide (3,4 epoxybutene-1), styrene oxide, glycidol, etc.

The silicon derivative employed may be an inorganic halo silane or a silicon halide or a silicon oxyhalide including for example, silicon tetrachloride, silicon tetrabromide, silico-chloroform, dichlorosilane, monochlorosilane, silicon oxychloride, disilicon hexachloride, and other polysilicon polyhalides and oxyhalides. The inorganic silicon halides produce beta halo alkoxy silicon mono-, di-, or tri-halides or substituted derivatives thereof depending on the type of epoxide compound employed in the reaction. Organo substituted silicon halides may be employed in which the substituent organic group may be selected from the organic radicals mentioned above, but are best illustrated by the alkyl silicon halides. The organo silicon halides give derivatives of halo alkoxy alkyl silicon type.

The reaction that takes place may be illustrated by that which takes place between silicon tetrachloride and ethylene oxide, as follows:

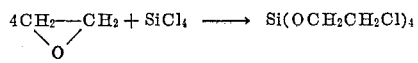

The reactions may occur stepwise along the pattern:

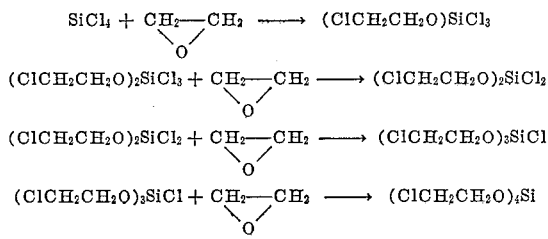

While the invention has been illustrated above by the reaction of an individual epihydrin with an individual silicon halide, mixtures of various reactants may be employed if desired but control of the process is best carried out as further illustrated below in the examples by the use of individual reactants. Nevertheless mixtures of one or more epihydrins may be reacted with one or a mixture of silicon halides of any of the types referred to above, or a single epihydrin may be reacted with a mixture of the silicon derivatives.

The reaction involved in the present invention is usually exothermic, and consequently the conditions of reaction, including temperature, rate of addition of reactant, etc., are controlled to produce the desired reaction. When no solvent or diluent is present, the unsubstituted epihydrin is reacted with the silicon derivative while cooling the reaction zone as by means of an ice bath. With some of the substituted derivatives such as epichlorhydrin, the reaction zone may be heated to refluxing temperatures. In the case where the reaction is not highly exothermic, as with the higher epoxide derivatives, the reactants may be added directly together and warmed.

The reaction may also be controlled by the use of an organic liquid solvent or diluent, inert to the materials undergoing reaction. Such solvent or diluent may be chosen with the desired boiling point and solvent characteristics for the particular reaction being carried out. The solvent or diluent may be selected for example from any one of the following or mixtures thereof: inert hydrocarbons such as petroleum distillates, hexane, octane, etc., benzene, toluene, xylene, etc., or the ethers such as diethyl ether, dibutyl ether, anisole, dioxane, or the esters such as ethyl acetate, or ketones, carbon tetrachloride, carbon disulfide, nitrobenzene and the like.

Any desired feasible way of contacting the reactants may be employed depending on their nature and the conditions under which they are reacted. When the epoxide is a gas, such as ethylene oxide, it may be introduced beneath the surface of the silicon halide or its solution in a solvent, as for example through a sintered ceramic disperser, or as a fine stream of bubbles during efficient stirring. Or the reaction product may be formed continuously by the technique of countercurrent flow, with continuous or discontinuous recovery or removal of reaction product, and with or without recirculation of all or a portion of the reaction mixture through the reaction zone. If a liquid, the epoxide may be slowly added directly, or in one of the solvents referred to above as a diluent, to the silicon halide alone or in solution. Or here too, methods involving counter-current flow may be used.

The exothermic reaction may be kept under control by one of the expedients referred to above as by the use of cooling, or by control of the rate of addition of epoxide, or by the use of the diluent or solvent, or by any combination of such expedients. Where temperatures are employed as explained above under which refluxing takes place, rate of addition of reactant, or use of diluent or solvent, etc., may also be used to control the rate of reaction so as for example to permit gentle reflux of the solvent or of the silicon halide.

The reaction of the present invention is an addition reaction wherein the epoxide splits at the ring and interposes itself between the silicon and halide atoms. Under properly controlled conditions, no side products are formed and the reaction proceeds very smoothly on mixing the reactants. Desired intermediates, such as beta haloalkoxy silicon mono-, di-, or tri-halides may be readily prepared by controlling the ratio of epoxide to silicon halide. In the formulations given earlier herein to illustrate the stepwise production of derivatives, such representation should not be construed as limiting, since other mechanisms may be involved and isomer formation may occur. In many cases it has been found that mixtures of the possible isomers have been formed. As well as forming the completely reacted esters, the reaction may be interrupted at any desired point in order to obtain the partial esters or an incompletely reacted material which may be desired as an intermediate or for use for other purposes as pointed out hereinabove.

In some cases it has not been found possible to distil the reaction mixture due either to their extremely high boiling point or to the fact that decomposition or polymerization occurs before distillation can be accomplished. In some cases distillation under reduced pressure may be used. The reaction mixtures may be used directly for purposes set forth herein without segregation of individual compounds.

When silicochloroform is employed as the silicon derivative reactant, the products formed by reaction with the epoxide derivative may be generally formulated as $$HSi.Y_x(OR.Y)_{3-x}$$

where Y is halogen such as chlorine or bromine, R is an alkylene or olefinyl group either substituted or unsubstituted, and $x$ is from 0 to 2.

When an organo silicon chloride is employed in the reaction, such as an alkyl silicon chloride, the products may be generally formulated as $$R'_ySiY_x(ORY)_{4-x-y}$$

wherein Y, R, and $x$ have the values set forth immediately above, and R' is an organic radical as hereinabove explained, and where $y$ may vary from 1 to 3 and where R' may be a mixed alkyl.

The products of this invention can be used as such as intermediates in the preparation of other silicon derivatives or organo, i. e. alkyl, etc., silicon derivatives, or they may be put to the same uses as the commercial silicon esters are at the present time. For instance, they may be dissolved in solvents and subjected to partial hydrolysis, and the partial hydrolytic and condensation products used as protective coatings, impregnants, adhesives, binders, textile treating agents, and the like, or they may be mixed with other organo silicon derivatives and employed in any of the manners set forth.

The following examples illustrate the products and processes of the present invention. All proportions are in parts by weight unless otherwise indicated.

1. One hundred and seventy parts of silicon tetrachloride were poured into a three-neck flask fitted with a condenser with a calcium chloride tube, a motor stirrer, a gas inlet tube, and cooled by an ice-water bath. Ethylene oxide was bubbled in and the stirrer started. The tared flask was weighed periodically until 180 parts of the ethylene oxide was added. Stirring was continued but gas addition was stopped. The ice bath was removed and the reaction mixture allowed to come to room temperature with stirring.

The colorless oily liquid was degassed and low boiling fractions removed with an aspirator at 20 mm. pressure and a bath temperature of 60–80° C. through an uninsulated 4-bulb pear shaped column 20 cm. long. The column was then insulated with 2 layers of wool flannel, the bath temperature raised and the pressure reduced. The fraction (110 parts) coming over at 174–177° C.) at 8 mm. is the chlorethyl silicate. A further fraction (100 parts) coming over between 179–190° C. may be a mixture of the product and a polymer of it.

2. Into a three-necked round bottom flask, fitted with a condenser with a calcium chloride tube, a motor stirrer and a gas inlet tube, was poured 136 parts of silicochloroform (B. P. 32–36° C). Ethylene oxide was bubbled in with constant stirring and cooling with an ice-water bath. The gas addition was stopped when 135 parts had been added. Stirring was continued but the ice bath was removed and the reaction mixture allowed to come to room temperature.

Possible unreacted material was removed through a four-bulb pear shaped column using 20 mm. of pressure and a bath temperature of 60–100° C.

The column was then insulated with two layers of wool and distilled under reduced pressure and higher bath temperature. At 142° C. and 6 mm. pressure, the desired product (trichloroethoxysilane) (104 parts) distilled. Another fraction, 148–168° C. and 5 mm. (50 parts) may be a mixture of the product and its low boiling polymers.

3. A three-necked flask fitted with a motor stirrer, a condenser with drying tube in neck, and a dropping funnel, was loaded with 170 parts of silicon tetrachloride. 232 parts of propylene oxide was slowly dropped in through the funnel with constant stirring and the mixture kept cool with an ice-water bath. When all the propylene oxide had been added, the cooling bath was removed and stirring continued until the reaction mixture came to room temperature.

The colorless oily liquid was distilled under reduced pressure through an insulated four-bulb pear shaped column. The chlorpropyl silicate, a straw colored, mobile, oily liquid (254 parts) was collected between 177–184° C. and 4 mm., mostly at 180° C. Another fraction (34 parts) coming over at 190–195° C. may have been a mixture of the product and its polymer. A black high boiling residue remained.

4. Into a three-necked flask fitted with a condenser and drying tube, a stirrer and a dropping funnel, was placed 136 parts of silicochloroform. 174 parts of propylene oxide was added slowly through the dropping funnel while the mixture was vigorously stirred and the temperature kept down with an ice-water cooling bath. When all of the oxide had been added, the cooling bath was removed, and the liquid allowed to come to room temperature with continued stirring.

The reaction mixture was then distilled through a four-bulb pear shaped column (the lower two bulbs insulated with two layers of wool cloth), under reduced pressure. The fraction between 138–142° C. and 5 mm. was collected as the trichloropropoxy silane (117 parts). This was a light yellow, slightly viscous liquid. A further fraction (34 parts), which distilled unevenly, came over at 152–163° C. at 4 mm.

5. Into an improved type Milligan gas washing bottle fitted with a reflux condenser, was placed 174 parts silicon tetrabromide (0.5 mole) and 40 parts n-hexane as solvent and refluxing medium. The top of the condenser was fitted with a calcium chloride drying tube to provide anhydrous reflux conditions. Ethylene oxide gas, dried by passage through a calcium chloride drying train, was led into the reaction mixture through a tube to the bottom of the bottle. There, the fine stream of gas bubbles slowly rose through the liquid following a spiral path along the bottom of the Milligan glass helix.

Gas absorption was rapid and the reaction mixture soon heated up to refluxing temperature. Gaseous ethylene oxide was passed in for about six hours when the solution ceased to reflux and cooled to room temperature. The product was a clear practically colorless liquid (yellowish tinge) (338 parts). (The theoretical increase in weight due to reaction with ethylene oxide should have been 88 parts or two moles. The excess weight was due principally to dissolving of ethylene oxide in the reaction product.)

On distillation of the reaction product, the dissolved ethylene oxide and n-hexane boiled off first. The remainder (bromoethyl silicate) boiled almost entirely at 196–203° C. at about 5 mm. pressure. It came over as a clear heavy liquid of very sweetish odor and surprisingly low viscosity. There was no residue.

6. Into a 500 cc. three neck flask fitted with a calcium chloride tube-protected reflux condenser, motor-driven stirrer and dropping funnel, was placed 170 parts of silicon tetrachloride (1 mole). Through the dropping funnel was added 185 parts (2 moles) of epichlorohydrin at a rate of about 115 drops per minute with vigorous stirring. Half-way through the addition, the temperature of the reaction mixture had risen only from 28° C. to 32° C., so the flask was placed in an oil bath and kept at 60° C. throughout the rest of the addition of the epichlorohydrin. Appreciable reflux now occurred, but practically ceased towards the end of the addition. The product was a clear orange viscous liquid of strong pungent odor.

7. 85 parts of silicon tetrachloride was placed in a three-necked flask fitted with a motor stirrer, a condenser with a calcium chloride tube, and a dropping funnel. Through the funnel 29 parts of propylene oxide was dropped in with constant stirring and simultaneous cooling of the reaction vessel with an ice-water bath. When the addition was completed, stirring was continued without cooling until room temperature was reached.

The mixture was then fractionally distilled through a column 37 cm. long composed of eight pear shaped bulbs. The fraction boiling at 165–168° C. (54 parts) was the chloropropoxy silicon trichloride.

8. 7.2 parts of ethyl silicon trichloride was placed in a three-necked flask equipped for stirring, refluxing under anhydrous conditions and dropwise addition of other reactants. While keeping the reaction cool with an ice bath, 20.2 parts of butadiene monoxide were slowly added with constant stirring. When the addition was completed, the brown reaction mixture was allowed to come to room temperature, with constant stirring.

Attempts to distil this mixture under reduced pressure result in polymerization and decomposition, the product turning from a liquid to a dark brown, sticky, rubbery mass, which hardened on cooling.

9. In a three-necked flask equipped for stirring, refluxing and dropwise addition of reactants, was poured 285 parts of silicon oxychloride. 100 parts of pentane were then put in and the mixture stirred. With sufficient cooling to maintain a gentle reflux, 135 parts of propylene oxide was added. When the addition was complete, the reaction mixture was allowed to come to room temperature.

The pentane was distilled off through a column containing eight pear-shaped bulbs, leaving behind a dark brown colored viscous residue, which decomposed upon strong heating.

10. A three-necked round-bottom flask is fitted with motor stirrer, a condenser with a calcium chloride drying tube in its neck, and a gas inlet tube. The flask is initially charged with 21 parts of ethyl silicon trichloride. Ethylene oxide is then bubbled in with constant stirring and cooling until approximately 17 parts have been added. The stirring is then discontinued and the liquid is allowed to come to room temperature.

The reaction mixture is distilled through an eight-bulbed pear-shaped column under reduced pressure. The beta-chloroethyl ethane siliconate (20 parts) distills over smoothly at 146–148° C. at 6 mm.

11. A round-bottom flask with gas inlet and exit tubes fitted in its neck, is charged with 37.1 parts of ethyl silicon tribromide. With constant cooling, 21 parts (plus 10% excess) of ethylene oxide is bubbled in. The reaction mixture is then distilled under reduced pressure. The beta-bromoethyl ethane siliconate, a white viscous liquid, which turns orange-brown on standing, distills over at 210–214° C. at 5 mm.

12. In a round-bottom flask fitted with a gas inlet, as well as a gas outlet, is charged 14 parts of diethyl chlorosilane. Ethylene oxide (5.5 parts plus 10% excess) is bubbled in while keeping the flask cool in an ice bath. At the end of the reaction, the mixture is allowed to come to room temperature and distilled under reduced pressure. The diethyl di(beta - chloroethoxy) silane comes over at 45° C. and 7 mm., though an eight bulbed column.

13. A three-necked round bottom flask is fitted with a motor driven stirrer, a condenser with a calcium chloride tube in it, and a dropping funnel. The flask is charged with 29 parts of epichlorhydrin, which was then brought to a boil with an oil bath. Into this boiling reagent, is dropped 16.5 parts of ethyl silicon trichloride. When all the silicon trichloride is added, the oil bath is raised to 200° C. and heating continued until refluxing stops. A dark brown viscous material results.

Attempts to fractionate the reaction product under reduced pressure (5–8 mm.) and relatively high temperatures (260–275° C.) is difficult due to decomposition.

14. In a three-neck round bottom flask, equipped with a motor stirrer, a condenser with a drying tube in it, and a dropping funnel, is put 38 parts of methyl silicon trichloride. 43.5 parts of propylene oxide are slowly dropped in with constant stirring while keeping the reaction temperature down with an ice bath. When all the oxide is added, stirring is continued but the ice bath is removed and the mass allowed to come to room temperature.

The solution is then subjected to fractional distillation under reduced pressure through an insulated four-bulbed pear shaped column. The chloropropyl methane siliconate (30 parts), a light oil, comes over between 118–120.5° C. at 3 mm. Another fraction (35 parts), distilling unevenly at 123–145° C. at 3 mm. may be the product in a mixture with its polymer or isomer.

15. A three-necked round-bottom flask is fitted with a motor driven stirrer, a condenser with a calcium chloride tube in it, and a dropping funnel. It is initially loaded with 41 parts ethyl silicon trichloride. Then 43.5 parts of propylene oxide is added with good stirring and cooling of the reaction vessel with an ice bath. When the addition of the oxide is concluded, the ice bath is removed but the stirring is maintained until room temperature is reached.

The reaction product is then fractionally distilled under reduced pressure through a column comprised of four pear shaped bulbs, insulated with wool wrappings. The fraction delivered at 140–145° C. (mostly 142° C.) at 5 mm., is the chloro-propyl ethane siliconate (30 parts of a light oily liquid).

16. Into a three-necked flask which is fitted with a dropping funnel, a motor stirrer and a condenser with a drying tube in its neck, is poured 48 parts of diethyl silicon dichloride. While stirring and cooling the reaction with an ice bath, 29 parts of propylene oxide are added. After this addition is completed, the stirring is continued but the cooling bath is taken away and the mixture allowed to come to room temperature.

Subsequently the mixture is fractionally distilled under reduced pressure, 34 parts of a straw colored light oil coming over at 105–108° C. and 4 mm. is the dichloropropoxy diethyl silane. Another fraction distilled unevenly at 110–125° C. and 4 mm. and probably is a mixture of the desired material and its low polymer, or isomer.

17. To 15 parts of propylene oxide in 25 parts of carbon tetrachloride, in a three-necked flask, equipped with a stirrer, reflux condenser with calcium chloride tube in its neck and a dropping funnel, is added slowly 41 parts of ethyl silicon trichloride in 25 parts of carbon tetrachloride. The mixture is then refluxed for four hours and distilled through a column of eight pear-shaped bulbs. The ethyl chloropropoxy dichlorosilane distills at 195–215° C.

In recapitulation, besides the silicon halides indicated above, other silicon halides of the present invention such as dichlorosilane, monochlorosilane, alkyl and aryl derivatives of silicochloroform, dichlorosilane and the like may be reacted with epoxide compounds to form esters as described above. In general all of the derivatives of this invention may be typified by the formula:

$$SiR'_xH_yY_z(ORY)_{4-x-y-z}$$

where the sum $x+y+z$ must not be greater than 3, where R' may be an alkyl, aryl or mixed alkyl radicals, where R is alkylene, and Y is halogen.

Having thus set forth our invention, we claim:

1. The method of preparing halo esters of silicic acids which comprises reacting silicon tetrachloride with an epoxide containing three carbon atoms.
2. The method as set forth in claim 1 in which an organic liquid solvent is present.
3. The method as set forth in claim 2 in which the epoxide is epichlorhydrin.
4. The method as set forth in claim 2 in which the epoxide is propylene oxide.
5. The method as set forth in claim 1 in which the epoxide is epichlorhydrin.
6. The method as set forth in claim 1 in which the epoxide is propylene oxide.

JOHN B. RUST.
LEONARD SPIALTER.

References Cited in the file of this patent

UNITED STATES PATENTS

| Number | Name | Date |
|---|---|---|
| 1,944,274 | Salzberg | Jan. 23, 1934 |
| 2,242,400 | Loane | May 20, 1941 |
| 2,381,137 | Patnode | Aug. 7, 1945 |
| 2,381,138 | Patnode | Aug. 7, 1945 |
| 2,381,139 | Sauer | Aug. 7, 1945 |
| 2,438,520 | Robie | Mar. 30, 1948 |

FOREIGN PATENTS

| Number | Country | Date |
|---|---|---|
| 459,738 | Germany | May 15, 1928 |

OTHER REFERENCES

Rebaul et al., Liebigs Annalen der Chemie, vol. 119, page 238 (1861).

Taurke, Ber. Deut. Chem., vol. 38, pages 1661–1670 (1905).

Malinorske, Jour. Gen. Chem. (USSR), vol. 10, pages 1918–1922 (1940).

Volnov, Chemical Abstracts, pages 3962–3 (1941), vol. 35.

Schunb et al., J. Amer. Chem. Soc., vol. 63, pages 2753–2755 (1941).

Post, "The Chemistry of Aliphatic Ortho-Esters," 1943, pages 123, 127, 128, 129.